Aug. 8, 1944.   H. H. BLAU   2,355,262
CONSTRUCTION BLOCK AND METHOD OF MANUFACTURE
Filed June 10, 1941
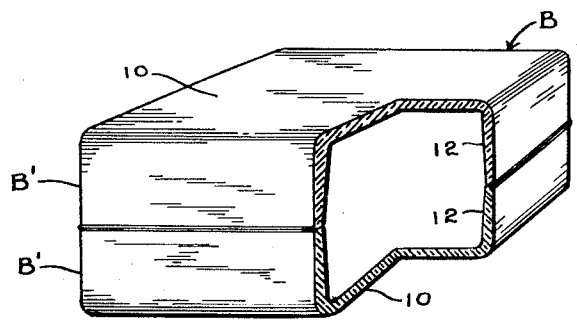
Inventor
HENRY H. BLAU
By
*T. H. Knight*
Attorney Patented Aug. 8, 1944

2,355,262

UNITED STATES PATENT OFFICE 2,355,262

CONSTRUCTION BLOCK AND METHOD OF MANUFACTURE

Henry H. Blau, Elmira, N. Y., assignor to Corning Glass Works, Corning, N. Y., a corporation of New York Application June 10, 1941, Serial No. 397,496

5 Claims. (Cl. 88—59)

The present invention relates to hollow construction blocks composed of glass or other light transmitting materials. Such blocks have for some time past been made by pressing complementary box-like units by conventional glass pressing methods and then hermetically sealing two such units together to form a hollow glass building block adapted for use in a masonry structure. Ordinarily the inner surfaces of these blocks opposite those which ultimately form a portion of a wall surface are provided with special configurations, usually in the form of flutes, lenses, or prisms arranged to direct and distribute natural or artificial light intercepted by one wall surface into an area adjacent the opposite wall surface without glare.

One criticism of such a structure is that the alteration of shape characteristics of the wall surfaces or faces of the block is very likely to introduce improper stress distribution therein and weaken its mechanical and/or thermal strength characteristics. To overcome the necessity of imparting special shape characteristics to the block face surfaces, in applications where diffusion of light is all that is required, or to enable simplification of the surface configuration of the block to such an extent that the introduction of objectionable stress characteristics are unlikely, their surfaces are sometimes stippled, sandblasted, or etched, or as an alternative to such practice, mats or glass fibre are sealed between the block halves to assist in the reduction of glare. This latter practice, of course, appreciably increases the cost of manufacture and, therefore, tends to restrict the more general use of this form of structure.

In all of these arrangements, the edges through the side walls joining the block faces are unaffected by such light diffusing expedients and, accordingly, an objectionable amount of uncontrolled light is transmitted through such edges so that the diffusing area of each block is surrounded by a bright glaring outline or frame of clear glass. To overcome this latter objection, block halves have sometimes been sealed to one another by metallizing their adjoining edges and then soldering the metallized surfaces to one another, but the structure is objectionable because of cost of manufacture. Also, the strength is often less than that of a similar block comprising one homogeneous mass of glass, as is obtained by fusing the halves together, and the danger of an imperfect seal between the halves is also greater.

The prime objects of the present invention are improved forms of construction blocks.

Other objects are improved methods of glass construction block manufacture.

Further objects and features of the invention can best be ascertained from a further perusal of the specification and the accompanying drawing which is a perspective view, partly broken away, of a building block embodying the principles of the invention.

The block shown bears the general designation B and comprises preformed complemental parts B'—B'. Each part B' includes a substantially flat face 10 which may be molded with any desired inner or outer surface configuration, but which has been shown plain and having a continuous integral flange 12 surrounding the face. In manufacture, the meeting edges of the flanges 12 of two parts G' are heated to fusion temperature and pressed together in sealing relation in a manner well known.

In one form of the invention, the construction blocks may be made of light diffusing and/or absorbing glass. If, for example, very slightly opalescent glass or a slightly tinted glass is employed the thickness of the glass comprising the wall face portions 10 of the block may be such that the light diffusing or opalescent characteristic of the glass will not be apparent. The thickness of the glass comprising flanges 12 adjoining such wall face portions will, on the other hand, be very great compared to the combined thickness of the wall faces when viewed from the same directions as the wall face portions and the light absorbing or diffusing characteristic of the glass accordingly will prevent objectionable light transmission or glare through this latter solid portion of the block. Control of light transmission through the block faces may be procured by any of the previously mentioned conventional methods, as by imparting special shapes to their inner and/or outer surfaces and any portion of the desired diffusion of light through the wall faces, equivalent to that obtained by stippling, sand blasting, etching or use of fibre mats, can be produced by employing more opalescent glass than employed in the preceding structure, the degree of opalescence being such that for the thickness of glass in the wall portions of the blocks, a desired degree of light diffusion is obtained.

A further alternative method of producing construction blocks of the foregoing general optical character is to employ glasses of the character described in my prior Patents No. 1,778,305 and No. 2,132,390.

Block halves formed of certain of the glasses disclosed in such patents when pressed are substantially transparent. However, when the adjoining edges of such halves are reheated as required to fuse the halves to one another, opacification in this localized heated region occurs with the result that a light screen is formed which effectively prevents any objectionable direct light transmission through the solid portion of the block. The faces 10 of the block may, of course, be provided with surface configurations lending to them light distribution and diffusion characteristics as in the past and in addition, or alternatively, may be opacified to any degree of translucency desired in the manner fully discussed in the aforesaid patents.

What is claimed is:

1. Two hollow glass parts arranged with their hollow portions facing one another and their adjoining edges fused to each other to form a hermetically sealed hollow building unit, said unit being composed of opacifiable glass and the portion of which is in the vicinity of the joined edges being opacified.

2. Two hollow glass parts arranged with their hollow portions facing one another and their adjoining edges fused to each other to form a hermetically sealed hollow building unit, said unit being composed of transparent glass parts of opacifiable glass and having those portions thereof in the vicinity of their line of juncture opacified to prevent objectionable direct light transmission therethrough.

3. A hermetically sealed hollow building unit having mortar contacting faces, comprising preformed complemental parts of thermally opacifiable glass integrally fused together in the mortar-contacting faces, said mortar contacting faces being at least in part opacified.

4. Two hollow glass parts arranged with their hollow portions facing one another and their adjoining edges fused to each other to form a hermetically sealed hollow building unit, said parts being composed of a glass composition which becomes opacified in the region of fusion as they are fused to one another.

5. Two hollow glass parts arranged with their hollow portions facing one another and their adjoining edges fused to each other to form a hermetically sealed hollow building unit, one of said parts being composed of a glass composition which becomes opacified in the region of fusion as it is fused to the other part.

HENRY H. BLAU.